Patented Dec. 22, 1936

2,065,069

UNITED STATES PATENT OFFICE 2,065,069

PROCESS FOR COATING PLASTER

George L. Hadden, South Orange, N. J., assignor to Doherty Research Company, New York, N. Y., a corporation of Delaware No Drawing. Application January 26, 1935, Serial No. 3,647

2 Claims. (Cl. 91—68)

This invention relates to the finishing of plaster, and more particularly concerns an improved method of finishing and decorating moist freshly plastered walls and like surfaces.

Heretofore it has been necessary to allow moist, freshly-plastered walls to dry out over a period of several days or weeks before applying a finishing coat of paint or the like, in order to protect the finishing coat against cracking or peeling, and against staining by moisture absorbed from the plaster, and against "burning" by free lime on the surface of the plaster.

A primary object of the present invention is to provide a process of finishing moist freshly-plastered walls and other surfaces which can be applied without substantial delay between the plastering and finishing operations and which produces a strongly adhesive finish which is not subject to cracking or peeling or other damage over a normal period of use.

Another object of this invention is to provide a process of finishing moist freshly plastered walls and the like which is applicable without adverse effect on the plaster which forms the base for the finish.

With the above and other objects and features in view, the invention consists in the improved process for finishing moist freshly-plastered walls which is hereinafter described and more particularly defined by the accompanying claims.

The process forming the subject of the present invention is applicable to the quick finishing and decorating of surfaces of slow setting and drying plasters and cements having as their principal ingredients water and Portland cement, lime, gypsum, and the like. The first step of the process consists in applying to the surface of green plaster or cement by brushing or spraying a liquid quick curing waterproof sizing or coating consisting of vulcanized substantially uncoagulated rubber latex such as described in U. S. Patent 1,443,149 granted to Philip Schidrowitz. A liquid vulcanized rubber latex coating of the type referred to can be applied to a "green" plaster wall immediately after the plastering operation has been completed, and only six or eight hours is necessary to allow the rubber in the latex coating to coagulate by evaporation of water from the latex coat, before applying a finishing coat of paint or other decorating finish. Moist freshly plastered walls thus finished and decorated are an improvement over walls finished in the ordinary manner, apparently because the waterproof latex coating protects the plaster against rapid evaporation of moisture during the setting period so that the plaster cures and sets without cracking. Moreover the latex coat provides an ideal base for the paint finish to which the paint strongly adheres, and the paint is protected by the latex sizing against moisture stains and deterioration or peeling such as often occurs when the paint is not thoroughly insulated from the plaster.

The rubber latex coating which is applied to the "green" plaster walls may advantageously embody a pigment such as zinc oxide or lithopone. A suitable latex for use as a waterproof sizing can be prepared by adding ammonia in dilute aqueous solution to a 30–40% rubber latex, and admixing with the latex a suitable amount of a pigment such as zinc oxide, together with 3 to 7% of sulphur (or the sulphur equivalent in a compound such as sodium polysulfide) and a small amount of an accelerator such as piperidine, sodium polysulfide or other well known rubber accelerator. The latex mixture is vulcanized while in aqueous solution by subjecting it to suitable heat and pressure as described in the aforementioned Schidrowitz patent. Coagulation of the rubber is effected after application of the vulcanized latex coating to the plaster wall, by evaporation of the liquid in which the rubber is held in suspension in the original latex.

The invention having been thus described, what is claimed as new is:

1. The process of finishing and decorating moist, freshly plastered walls which comprises applying a waterproofing coat of vulcanized substantially uncoagulated alkaline rubber latex, allowing the rubber to coagulate by evaporation, and applying a finishing coat of paint.

2. The process of finishing and decorating moist unset surfaces of plaster, cement and the like, which comprises applying thereto a thin waterproof sizing coat of vulcanized substantially uncoagulated rubber latex, allowing the rubber in the coat to coagulate by evaporation of the latex liquid, and applying a coat of decorating material to the coagulated rubber sizing coat.

GEORGE L. HADDEN.